US012584811B2

(12) United States Patent
Bhandari et al.

(10) Patent No.: US 12,584,811 B2
(45) Date of Patent: Mar. 24, 2026

(54) UREA PRESSURE AND TEMPERATURE SENSOR WITH IMPROVED SEALING

(71) Applicant: PADMINI VNA MECHATRONICS LTD., Gurgaon (IN)

(72) Inventors: Kabir Bhandari, Gurgaon (IN); Om Kumar, Gurgaon (IN)

(73) Assignee: PADMINI VNA MECHATRONICS LTD., Gurgaon (IN)

( * ) Notice: Subject to any disclaimer, the term of this patent is extended or adjusted under 35 U.S.C. 154(b) by 312 days.

(21) Appl. No.: 18/258,567

(22) PCT Filed: Dec. 25, 2021

(86) PCT No.: PCT/IB2021/062311
§ 371 (c)(1),
(2) Date: Jun. 21, 2023

(87) PCT Pub. No.: WO2022/137216
PCT Pub. Date: Jun. 30, 2022

(65) Prior Publication Data
US 2023/0408358 A1 Dec. 21, 2023

(30) Foreign Application Priority Data
Dec. 21, 2020 (IN) .............................. 202011055657

(51) Int. Cl.
*G01L 19/06* (2006.01)
*G01K 7/22* (2006.01)
*G01L 19/00* (2006.01)
(52) U.S. Cl.
CPC ............ *G01L 19/0092* (2013.01); *G01K 7/22* (2013.01); *G01L 19/0627* (2013.01)

(58) Field of Classification Search
None
See application file for complete search history.

(56) References Cited

U.S. PATENT DOCUMENTS

| | | | |
|---|---|---|---|
| 10,087,804 B2 | 10/2018 | Muntean et al. | |
| 2011/0138921 A1* | 6/2011 | Colombo .............. | G01L 19/147 |
| | | | 73/706 |
| 2015/0122917 A1* | 5/2015 | Shaw .................... | F01N 3/2066 |
| | | | 239/584 |
| 2018/0045098 A1* | 2/2018 | Hwang .................. | B60K 15/03 |

FOREIGN PATENT DOCUMENTS

| | | | |
|---|---|---|---|
| CN | 202533211 U | * | 11/2012 |
| WO | 2013028714 A1 | | 2/2013 |

OTHER PUBLICATIONS https://www.te.com/commerce/DocumentDelivery/DDEController?Action=showdoc&DocId=Data+Sheet%7FUrea_Temperature_Probe%7FA%7Fpdf%7FEnglish%7FENGDS_Urea_Temperature_Probe_A.pdf%7FCAT-NTC0062.

* cited by examiner

*Primary Examiner* — Herbert K Roberts
(74) *Attorney, Agent, or Firm* — S.J. Intellectual Property LTD

(57) ABSTRACT

The present invention relates to a urea pressure and temperature sensor (100) with improved sealing. More particularly, the present invention relates to a urea pressure and temperature sensor (100) comprising of a connector seal (7) and a sealing gasket (4) that improves the sealing and prevents any water ingress or urea accumulation.

5 Claims, 4 Drawing Sheets

Fig. 4c [AMENDED]

UREA PRESSURE AND TEMPERATURE SENSOR WITH IMPROVED SEALING

FIELD OF THE INVENTION

The present invention relates to a urea pressure and temperature sensor with improved sealing. More particularly, the present invention relates to a urea pressure and temperature sensor comprising of a connector seal and a sealing gasket that improves the sealing and prevents any water ingress or urea accumulation.

BACKGROUND OF THE INVENTION

At present, the pollution is increasing with increasing number of vehicles and vehicle emissions has become the biggest source of pollution. To curb these vehicle emissions, various researches are taking place and the most potential technology in this sector is selective catalyst reduction (SCR) systems in which a liquid-reductant agent preferably automotive grade urea is injected through a special catalyst into the exhaust stream of a diesel engine. The use of more and more diesel vehicles is growing which are equipped with nitrogen-oxide sensors. Nitrogen-oxide sensors control the amount of urea injected into catalytic converter for the selective catalytic reduction in order to reduce the nitrogen oxides (NOx) emissions in modern diesel cars. In new automobiles, the urea pressure sensor is freeze-proof, addressing a concern of car makers as the urea solution typically freezes easily and can damage some pressure sensor designs.

For effective operation of SCR systems, the optimum temperature and pressure conditions of urea are also important. Hence, urea pressure sensors and urea temperature sensors are utilized in such systems. Some sensors with combined pressure and temperature sensor are also known in the state of the art.

The urea pressure and temperature sensor known in the prior arts suffer some drawbacks which are responsible for reduced life of such sensors. One of the drawbacks known is leakage and water ingress to the connector assembly where a mating connector is connected. The water ingress issue occurs during the vehicle service at disengagement of mating connector due to which life of product reduced. Also, a lot of urea pressure sensors are known which often complain of inaccurate results due to urea accumulation in the cavities. Urea accumulation hampers the performance of the pressure sensor and consequently it has to be replaced. Due to such drawbacks, these urea pressure and temperature sensors are not able to meet the industry standards.

CN205748784U describes an automotive urea pressure sensor when assembled and as per the arrangement described in the Chinese patent application, the locking member is screwed into the chassis, the locking member against the spacer, and further by the spacer pressed against the glass ring, the glass ring under the action of compression of the sealing ring and the alkali resistance glass ring and the base a snug fit between the seal to be achieved, alkali-resistant sealing ring by the lock member a compressive deformation amount of a projection control. The Chinese invention does not have any connector seal and hence there is possibility of leakage and water ingress.

Therefore, there is a need of improved urea pressure and temperature sensors that improves the sealing and overcomes above mentioned drawbacks. Further there is a need for improved sensor to meet the industry standards and prolong the life of these sensors.

OBJECT OF THE INVENTION

The main object of the present invention is to provide an improved urea pressure and temperature sensor with improved sealing comprising of a connector seal and a sealing gasket that improves the sealing and prevents any water ingress or urea accumulation.

Another object of the present invention is to improve NOx reduction from exhaust utilizing an improved urea pressure and temperature sensor for prolonged life of automobile.

Yet another object of the present invention is to provide sealing inside of connector assembly utilizing a connector seal that prevents water ingress during the vehicle service at disengagement of the mating connector.

Yet another object of the present invention is to provide sealing utilizing a sealing gasket in the top area cavity instead of O-ring used in conventional design for resolving urea dead volume accumulation in sensor.

Still another object of the present invention is to provide a urea pressure and temperature sensor with improved sealing and accurate performance unaffected due to urea accumulation.

SUMMARY OF THE INVENTION

The present invention provides a urea pressure and temperature sensor comprising a sealing gasket and a connector seal that prevents any water ingress to connector assembly and urea accumulation to provide accurate results and prolong the life of the sensor used in the vehicle.

In an embodiment, the present invention provides a urea pressure and temperature sensor comprising a housing with an inlet and an outlet, a flow path, a plurality of O-ring, a negative temperature coefficient (NTC) housing, a sealing gasket, a pressure sensor, a terminal, a connector seal, a connector assembly, a printed circuit board and a cover; wherein said connector seal is provided over said connector assembly to prevent ingress of water during disengagement of a mating connector; and said sealing gasket is assembled to seal the pressure sensor and prevent accumulation of urea. The urea flows through the flow path and it is likely that some residue of urea remains in the region near the pressure sensor. The sealing gasket fills the top area cavity and during an air flash, the urea gets completely swept out with air pressure. The improved sealing provided in the urea pressure and temperature sensor prolongs the life of the sensor and helps in achieving accurate performance which otherwise was affected due to poor sealing.

In another embodiment, the present invention provides a connector seal assembled over a connector assembly to which a mating connector is attached. During disengagement of the mating connector, the water is likely to get leaked, however with use of a connector sealing which is preferably made of silicon material prevents the water ingress. A surrounding cavity is provided on the outer surface of the connector assembly in which the connector seal is fitted. The connector seal on the outer surface has at least two protruding ribs which seal against the surface of the housing and prevent water ingress.

In yet another embodiment, the present invention provides a sealing gasket that fills the top area cavity near the pressure sensor and resolves the issue of urea accumulation in sensor. The sealing gasket is preferably made of a high-grade rubber suitable for sealing. The sealing gasket is made to perfectly fit between the housing and pressure sensor. The sealing gasket on the outer surface has at least two ribs that provide sealing against the pressure sensor. Also, at the bottom the sealing gasket has an annular flange that supports the pressure sensor from the bottom.

Therefore, the present invention provides better NOx reduction from exhaust with improved urea pressure and temperature sensor for long life performance.

The above objects and advantages of the present invention will become apparent from the hereinafter set forth brief description of the drawings, detailed description of the invention, and claims appended herewith.

BRIEF DESCRIPTION OF THE DRAWING

An understanding of the improved urea pressure sensor design in which the sealing provided in connector assembly and the O-ring replaced by sealing bush of the present invention may be obtained by reference to the following drawings:

FIG. 4c is a cropped side view of connector seal fitted on the connector assembly inside the housing in accordance with an embodiment of the present invention.

DETAILED DESCRIPTION OF THE INVENTION

Figure 1:
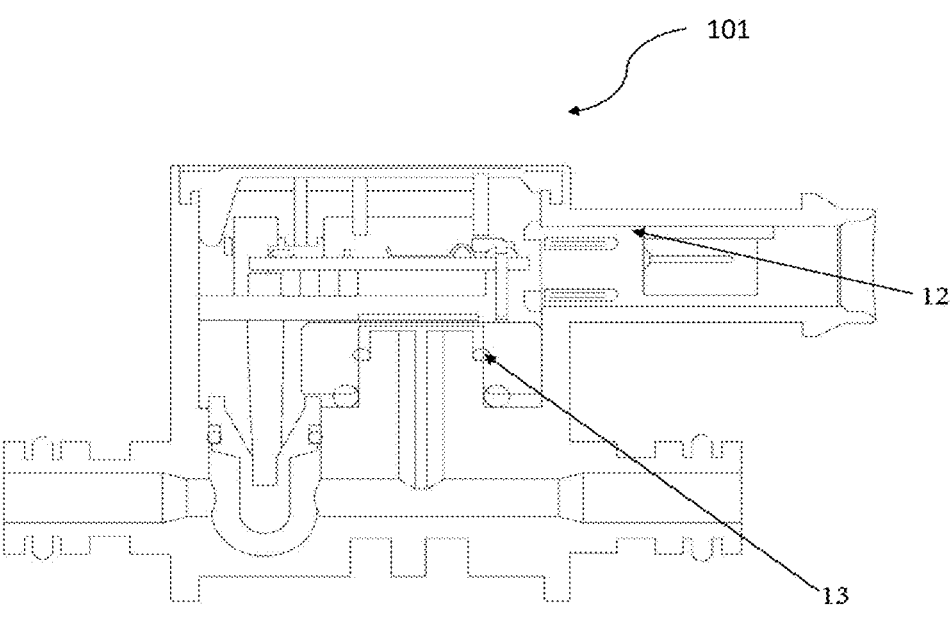
FIG. 1 is a cross-sectional view of a urea pressure and temperature sensor known in prior art.

The present invention will now be described hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough, and will fully convey the scope of the invention to those skilled in the art.

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

The present invention provides a urea pressure and temperature sensor with improved sealing. More particularly, the present invention relates to the urea pressure and temperature sensor in which the otherwise used O-ring is replaced with a sealing gasket which lefts no cavity in which urea residue gets accumulated and improves life and performance of the sensor. Further, a connector seal is provided on the connector assembly to prevent water ingress.

In a most preferred embodiment, the present invention provides a urea pressure and temperature sensor comprising a housing with an inlet and an outlet, a flow path, a plurality of O-ring, a negative temperature coefficient (NTC) housing enclosing NTC thermistor, a sealing gasket, a pressure sensor, a terminal, a connector seal, a connector assembly, a printed circuit board (PCB) and a cover; wherein said connector seal is provided over said connector assembly to prevent ingress of water during disengagement of a mating connector; and said sealing gasket is assembled to seal the pressure sensor and prevent accumulation of urea. The urea flows through the flow path and it is likely that some residue of urea remains in the region near the pressure sensor. The pressure sensor is preferably a ceramic pressure sensor and the NTC housing comprises of a NTC Thermistor for sensing temperature. The sealing gasket fills the top area cavity and during an air flash, the urea gets completely swept out with air pressure. The improved sealing provided in the urea pressure and temperature sensor prolongs the life of the sensor and helps in achieving accurate performance which otherwise was affected due to poor sealing.

Here, the housing, cover and connector assembly are preferably made of unique glass reinforced fiber polymer. The NTC housing is preferably made of unique stainless steel. The plurality of O ring is preferably made of high-grade rubbers suitable for the urea compatibility.

In another embodiment, the present invention provides a connector seal assembled over a connector assembly to which a mating connector is attached. During disengagement of the mating connector, the water is likely to get leaked, however with use of a connector sealing which is preferably made of silicon material prevents the water ingress. A surrounding cavity is provided on the outer surface of the connector assembly in which the connector seal is fitted. The connector seal on the outer surface has at least two protruding ribs which seal against the surface of the housing and prevent water ingress.

In yet another embodiment, the present invention provides a sealing gasket that fills the top area cavity near the pressure sensor and resolves the issue of urea accumulation in sensor. The sealing gasket is made to perfectly fit between the housing and pressure sensor. The sealing gasket on the outer surface has at least two ribs that provide sealing against the pressure sensor. Also, at the bottom the sealing gasket has an annular flange that supports the pressure sensor from the bottom.

Now referring to FIG. 1, a cross-sectional view of urea pressure and temperature sensor 101 known in the art is shown comprising a connector assembly 12 with no sealing provided between connector assembly 12 and the housing 1 that cause water ingress while vehicle service at disengagement of mating connector at the terminal. Further, in the urea pressure and sensor area, in the top area near the pressure sensor, sealing is provided using an O-ring 13, but a cavity is left in the that causes urea accumulation that results in poor performance of the urea pressure and temperature sensor.

Figure 2:
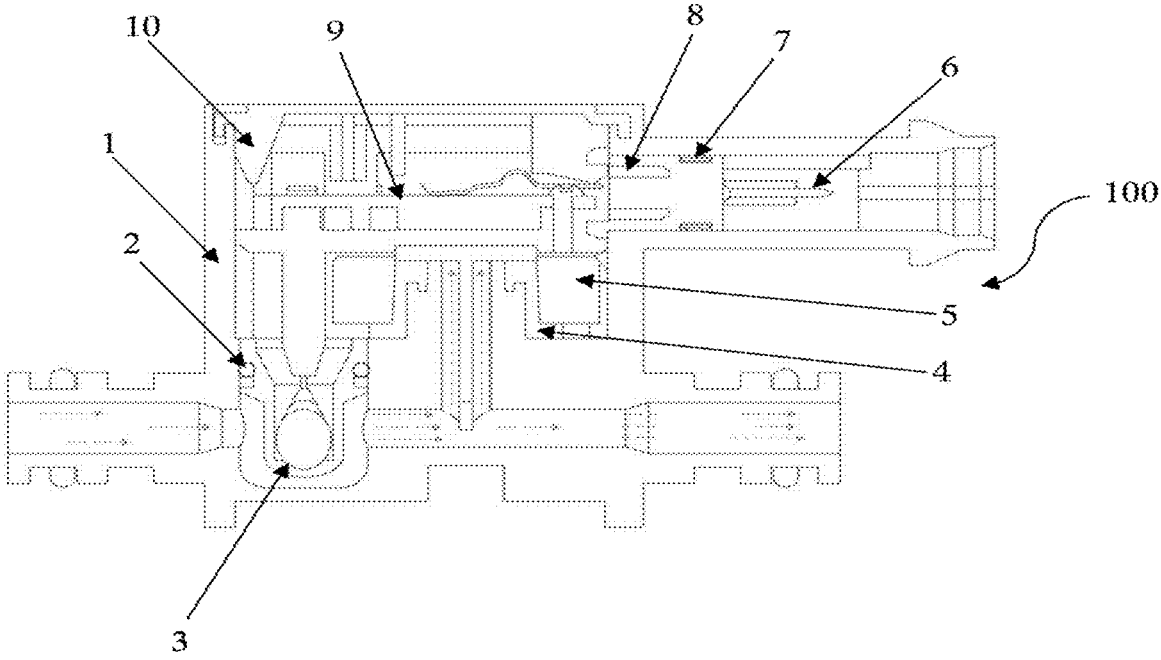
FIG. 2 is a cross-sectional view of a urea pressure and temperature sensor in accordance with an embodiment of the present invention.

Now referring to FIG. 2, the cross-sectional view of the improved urea pressure and temperature sensor 100 is shown comprising a housing 1, an O-ring 2, a NTC housing 3 enclosing a NTC thermistor, a sealing gasket 4, a pressure sensor 5, a terminal 6, a connector seal 7, a connector assembly 8, a PCB 9 and a cover 10. The housing 1 has an inlet 14 through which the urea enters in the flow path and exits from the outlet 15. The connector seal 7 prevents any water ingress while disengagement of a mating connector. The sealing gasket 4 fitted with the pressure sensor 5 is designed such that there is no cavity left in the top area near the pressure sensor 5 and hence any accumulation of urea is prevented.

Figure 3:
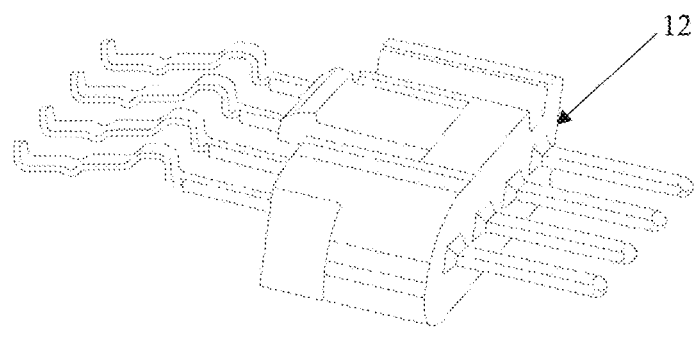
FIG. 3 is an isometric view of connector assembly known in prior art.

Now referring to FIG. 3, an isometric view of connector assembly 12 known in the prior art is shown. Said connector assembly 12 does not have any sealing and hence there is an issue of water ingress during the vehicle service at disengagement of mating connector.

Figure 4A:
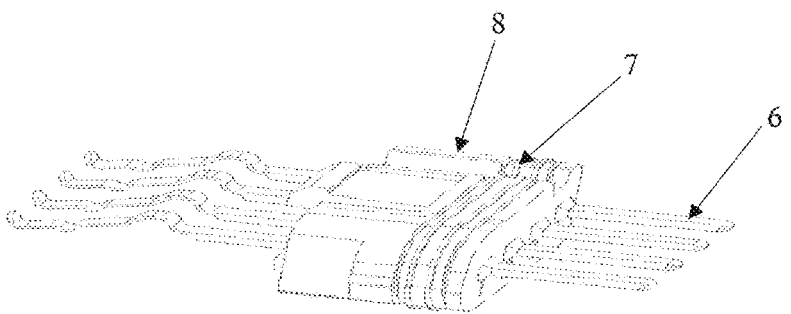
FIG. 4a is an isometric view of a connector assembly of a urea pressure and temperature sensor in accordance with an embodiment of the present invention.
Figure 4B:
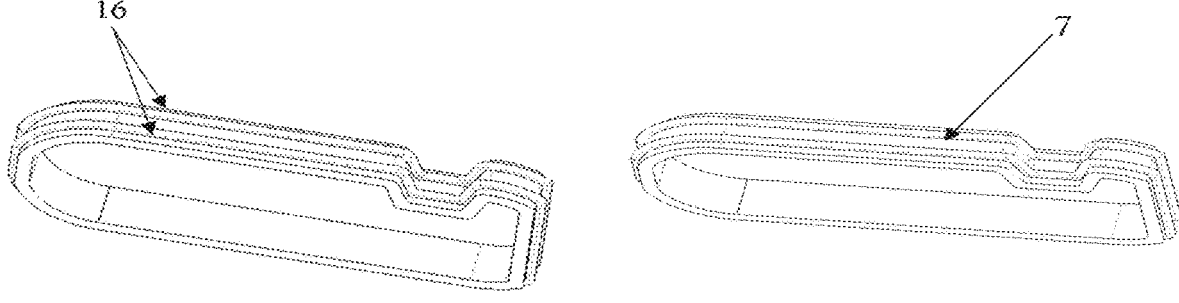
FIG. 4b is another isometric view and side view of a connector seal of a urea pressure and temperature sensor in accordance with an embodiment of the present invention.

Now referring to FIG. 4a, an isometric view of a connector assembly of a urea pressure and temperature sensor 100 is shown. Said connector assembly 8 comprises a plurality of terminal 6 and a connector seal 7. With the connector seal 7 assembled to the connector assembly 8, it is able to meet the IP67 rating with disengagement of mating connector. The IP67 rating indicates the sensor is completely protected against solid objects from entering the sensor, including dust, while it is completely submersible in 1 meter of water for up to 30 minutes before the moisture penetrates the housing. The isometric and front view of the connector seal 7 is preferably made of silicon and shown in FIG. 4b.

Now referring to FIG. 4c, the cropped side view of connector assembly 8 is shown. Said connector assembly 8 has a surrounding cavity provided on the outer surface of the connector assembly 8 in which the connector seal 7 is fitted. The connector seal 7 on the outer surface has at least two protruding ribs 16 which seal against the surface of the NTC housing 3 and prevent water ingress during disengagement of a mating connector connected at the terminal 6.

Figure 5:
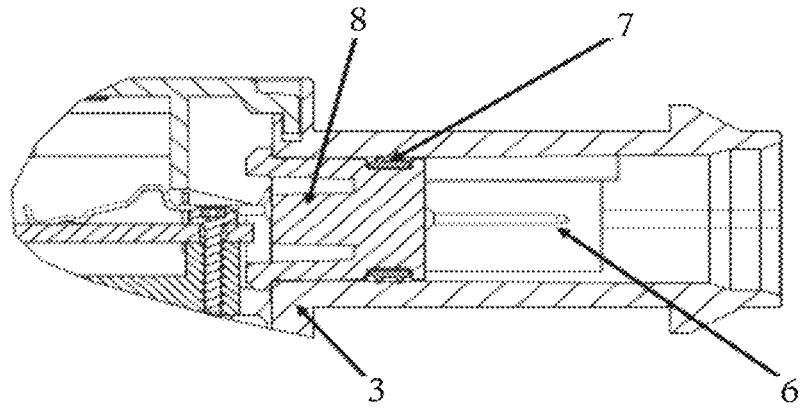
FIG. 5 is a cropped cross-sectional view of urea pressure and temperature sensor known in prior art.
Figure 5:
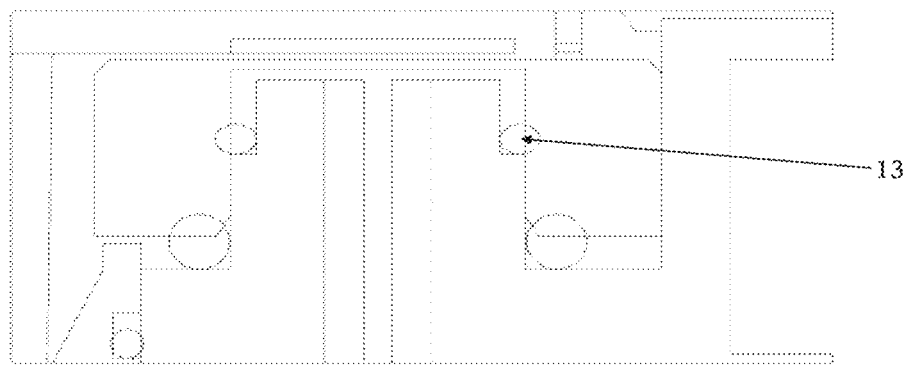

Now referring to FIG. 5, a cropped cross-sectional view of urea pressure and temperature sensor known in the prior art is shown. In the prior art, an O-ring 13 is provided in top area cavity to provide sealing but a cavity is left in which the urea gets accumulated and does not get washed even after air flash and hence the performance and life of the pressure sensor gets affected.

Figure 6A:
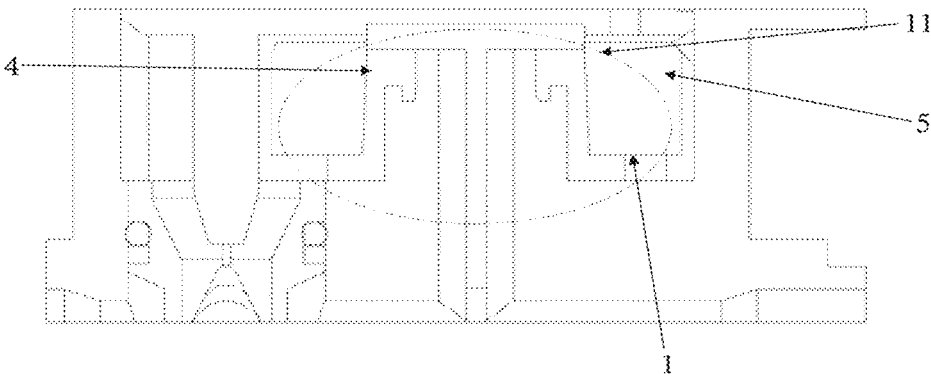
FIG. 6a is a cropped cross-sectional view of improved urea pressure and temperature sensor in accordance with an embodiment of the present invention.

Now referring to FIG. 6a, cropped cross-sectional view of improved urea pressure and temperature sensor is shown comprising a sealing gasket 4 which is fitted in the housing 1 in the pressure sensor region 11 near the pressure sensor 5 such that there is no cavity left in which the urea gets accumulated. Further, any urea that is left in the flow path gets swept away with air flash and gets washed away.

Figure 6B:
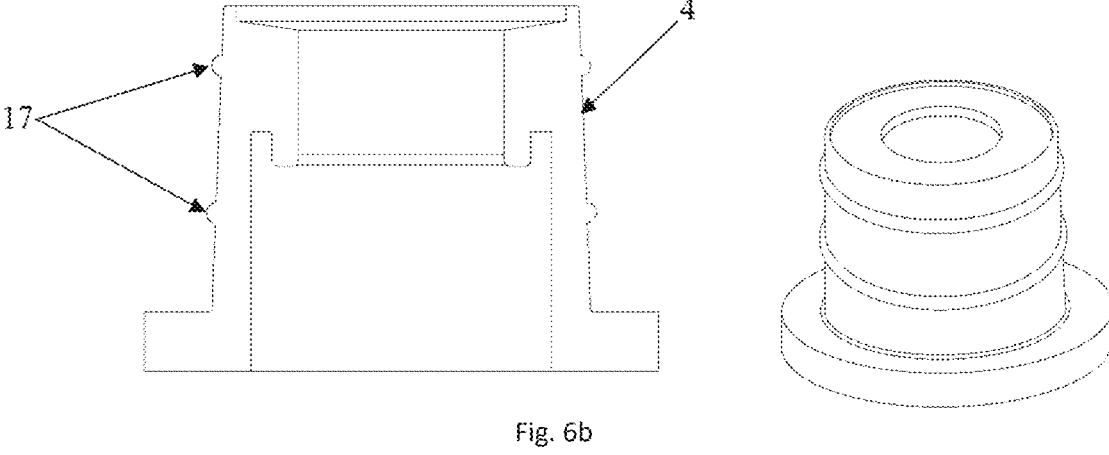
FIG. 6b is another cross-sectional and isometric views of sealing gasket in accordance with an embodiment of the present invention.
Figure 6C:
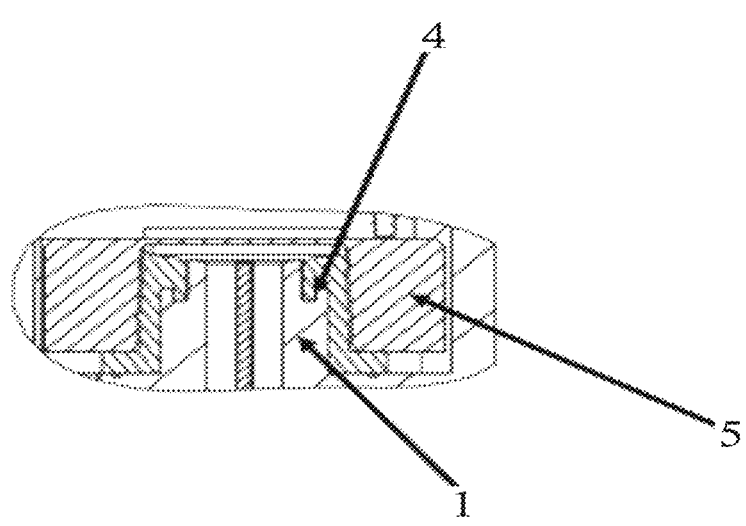
FIG. 6c is another cropped cross-sectional view of urea pressure and temperature sensor in accordance with an embodiment of the present invention.

Now referring to FIG. 6b, the cross-sectional and isometric views of sealing gasket 4 is shown. The sealing gasket 4 on the outer surface has at least two ribs 17 that provide sealing against the pressure sensor. Also, at the bottom the sealing gasket has an annular flange 18 that supports the pressure sensor from the bottom. FIG. 6c shows a cropped cross-sectional view of urea pressure and temperature sensor 100 comprising a sealing gasket 4 fitted between a part of housing 1 and the pressure sensor 5.

Therefore, the present invention provides an improved urea pressure sensor design with added sealing gasket and connector seal that reduces leakage and provides improved sealing.

Many modifications and other embodiments of the invention set forth herein will readily occur to one skilled in the art to which the invention pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

We claim:

1. A urea pressure and temperature sensor (100) comprising:
   a housing (1);
   an O-ring (2);
   a NTC housing (3) enclosing a NTC thermistor;
   a pressure sensor (5);
   a terminal (6);
   a connector assembly (8);
   a PCB (9); and
   a cover (10);
   wherein,
   said housing (1) has an inlet (14) through which urea enters in a flow path and exits from an outlet (15);
   said connector assembly (8) has a surrounding cavity provided on an outer surface of the connector assembly (8) in which a connector seal (7) is fitted and said connector seal (7) on its outer surface has at least two protruding ribs (16) which seal against the surface of the NTC housing (13) and prevent water ingress during disengagement of a mating connector connected at the terminal (6); and
   a sealing gasket (4) on the outer surface has at least two ribs (17) that provide sealing against the pressure sensor (5) and at the bottom said sealing gasket (4) has an annular flange (18) that supports the pressure sensor (5) from the bottom, fitted such that there is no cavity left near the pressure sensor (5) and hence accumulation of urea is prevented.

2. The urea pressure and temperature sensor (100) as claimed in claim 1, wherein said connector seal (7) assembled to the connector assembly (8) meets the IP67 rating with disengagement of mating connector.

3. The urea pressure and temperature sensor (100) as claimed in claim 1, wherein said pressure sensor (5) is preferably a ceramic pressure sensor and said NTC housing (3) comprises of a NTC Thermistor for sensing temperature.

4. The urea pressure and temperature sensor (100) as claimed in claim 1, wherein said housing (1), the connector assembly (8) and the cover (10) are made of unique glass reinforced fiber polymer, said NTC housing (3) is made of unique-stainless steel and said plurality of O-ring (2) is made of high-grade rubbers suitable for the urea compatibility.

5. The urea pressure and temperature sensor (100) as claimed in claim 1, wherein said connector sealing (7) is made of silicon material configured to prevents the water ingress and said sealing gasket (4) is made of a high-grade rubber for sealing.

\* \* \* \* \*